United States Patent [19]

Uchiyama et al.

[11] Patent Number: 5,568,028
[45] Date of Patent: Oct. 22, 1996

[54] TOOL LIFE MANAGEMENT SYSTEM

[75] Inventors: Tatsuhiro Uchiyama; Masanobu Takemoto; Toshiyuki Ogata, all of Kamanashi, Japan

[73] Assignee: Fanuc Ltd., Japan

[21] Appl. No.: 312,274

[22] Filed: Sep. 23, 1994

[30] Foreign Application Priority Data

Oct. 13, 1993 [JP] Japan .................... 5-255626

[51] Int. Cl.$^6$ .................................. G06F 15/46
[52] U.S. Cl. .................... 318/566; 318/433; 318/434; 318/568.16; 318/568.24; 364/474.17; 364/474.19
[58] Field of Search ................... 318/560–574, 318/432–434; 364/474.15–474.21

[56] References Cited

U.S. PATENT DOCUMENTS

| | | | |
|---|---|---|---|
| 4,442,493 | 4/1984 | Wakai et al. | 364/475 |
| 4,456,960 | 6/1984 | Wakai | 318/565 X |
| 4,547,847 | 10/1985 | Olig et al. | 318/561 X |
| 4,564,911 | 1/1986 | Smith et al. | 318/569 X |
| 4,713,770 | 12/1987 | Hayes et al. | 318/565 X |
| 4,802,095 | 1/1989 | Jeppsson | 364/474.17 |
| 4,833,617 | 5/1989 | Wang | 364/474.15 |
| 5,011,345 | 4/1991 | Nishigai et al. | 364/474.17 X |
| 5,018,071 | 5/1991 | Kihara et al. | 364/474.17 |
| 5,115,403 | 5/1992 | Yoneda et al. | 364/474.15 |
| 5,251,144 | 10/1993 | Ramamurthi | 364/474.19 |

*Primary Examiner*—Brian Sircus
*Attorney, Agent, or Firm*—Staas & Halsey

[57] ABSTRACT

A tool life management system for managing a tool life. The system includes a load torque measuring device for measuring an initial load torque of a spindle attached to a tool during an initial machining operation and for measuring an actual load torque of the spindle attached to the tool during a subsequent actual machining operation, a torque calculating device for calculating a tool wear detection torque based on a reference load torque, and for calculating a tool breakage detection torque based on a tool diameter, the reference load torque being the initial load torque of the spindle, a memory for storing the reference load torque, the tool wear detection torque and the tool breakage detection torque, a torque comparing device for comparing the actual load torque of the spindle with each of the tool wear detection torque and the tool breakage detection torque, and for outputting a result of the comparison, and a tool control device for controlling the tool in accordance with the result of the comparison.

7 Claims, 8 Drawing Sheets

| TOOL NO. | TOOL DIAMETER D | TOOL MATERIAL | REFERENCE LOAD TORQUE Tr | TOOL WEAR DETECTION TORQUE Tw | TOOL BREAKAGE DETECTION TORQUE Tb |
|---|---|---|---|---|---|
| 1 | T(1,1) | T(2,1) | T(3,1) | T(4,1) | T(5,1) |
| 2 | T(1,2) | T(2,2) | T(3,2) | T(4,2) | T(5,2) |
| ⋮ | ⋮ | ⋮ | ⋮ | ⋮ | ⋮ |
| j | T(1,j) | T(2,j) | T(3,j) | T(4,j) | T(5,j) |
| ⋮ | ⋮ | ⋮ | ⋮ | ⋮ | ⋮ |
| n | T(1,n) | T(2,n) | T(3,n) | T(4,n) | T(5,n) |

| NO. | TOOL MATERIAL |
|---|---|
| 1 | SK1 |
| 2 | SKH |
| . . . . | . . . . . |
| m | M (m) |

TOOL NO. 2    TOOL DIAMETER    Φ 2.0    MATERIAL SKH
ACTUAL LOAD TORQUE                1.3
REFERENCE LOAD TORQUE             1.2
TOOL WEAR DETECTION TORQUE        1.6
TOOL BREAKAGE DETECTION TORQUE    5.6

| TOOL NO. | TOOL DIAMETER | TOOL MATERIAL | REFERENCE LOAD TORQUE | TOOL WEAR DETECTION TORQUE | TOOL BREAKAGE DETECTION TORQUE |
|---|---|---|---|---|---|
| 1 | 1.0 | SKH | 0.8 | 1.0 | 1.4 |
| 2 | 2.0 | SKH | 1.2 | 1.6 | 5.6 |
| 3 | 3.0 | SKH | 1.6 | 2.1 | 10.8 |
| 4 | 3.8 | SKH | 3.1 | 4.0 | 14.9 |
| 5 | 4.8 | SKH | 3.9 | 5.1 | 19.8 |

——————— MATERIAL ———————
1.SK1    2.SKH    3. · · · ·    4. · · · ·

| CALCU-LATE | REGISTER | RETRIEVE | | | END |
|---|---|---|---|---|---|

FIG. 8

TOOL LIFE MANAGEMENT SYSTEM

BACKGROUND OF THE INVENTION

1. Field of the Invention

The present invention relates to a tool life management system for managing the lives of tools, and more particularly, to a tool life management system for an NC machine tool.

2. Description of the Related Art

It is widely known to manage the lives of tools used in NC machine tools. In one of such tool life managing methods, tool life is managed on the basis of the time periods for which the tools are used or the number of times the tools are used. This method, however, takes no account of differences in machining load and thus cannot manage the lives of tools with accuracy.

In view of this, there has been proposed a method of monitoring wear of tools based on change in load torque of the spindle, etc.

This conventional method, however, requires that the degree of change in load torque of the spindle be obtained empirically or statistically, making it necessary to carry out machining experiment or statistical process a considerable number of times. This method, therefore, requires a great deal of labor and skill.

SUMMARY OF THE INVENTION

The present invention was created in view of the above circumstances, and an object thereof is to provide a tool life management system permitting easy management of the lives of tools.

To achieve the above object, the present invention provides a tool life management system for managing lives of tools, characterized by comprising load torque measuring means for measuring a load torque of a spindle, torque calculating means for calculating a tool wear detection torque based on a reference load torque, and a tool breakage detection torque based on a tool diameter, the reference load torque being a load torque of the spindle obtained during an initial machining state, a memory for storing the reference load torque, the tool wear detection torque and the tool breakage detection torque, torque comparing means for comparing an actual load torque of the spindle during a machining state with each of the tool wear detection torque and the tool breakage detection torque, and outputting a result of the comparison, and tool control means for controlling tools in accordance with the result of the comparison.

The load torque measuring means measures the load torque of the spindle, and a load torque obtained during the initial machining state is used as the reference load torque. The torque calculating means obtains the tool wear detection torque based on the reference load torque, and obtains the tool breakage detection torque based on the tool diameter. The reference load torque, the tool wear detection torque and the tool breakage detection torque are stored in the memory.

Actual machining is then carried out, and the load torque measuring means measures an actual load torque of the spindle. The comparing means compares the actual load torque with each of the tool wear detection torque and the tool breakage detection torque, and outputs the result of the comparison. The tool control means controls tools in accordance with the result of the comparison. For example, the tool control means outputs a Z-axis deceleration command or a tool change command when the actual load torque becomes greater than the tool wear detection torque, and outputs a machining stop command to stop the machining operation or the tool change command when the actual load torque becomes greater than the tool breakage detection torque.

The above and other objects, features and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

An embodiment of the present invention will be described with reference to the drawings.

Figure 2:
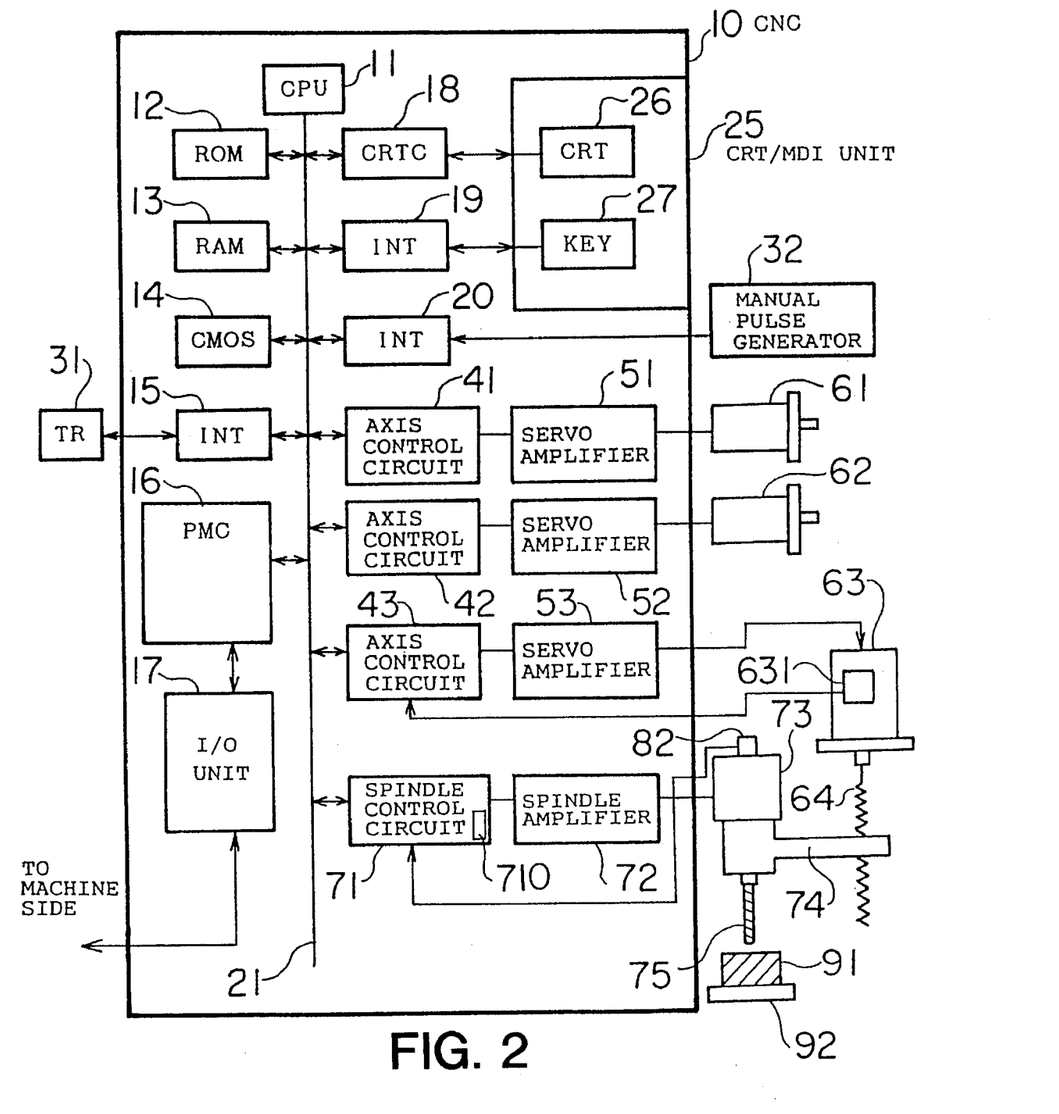
FIG. 2 is a block diagram of hardware of a computer numerical control (CNC) device for carrying out a tool life management system according to the present invention.

FIG. 2 is a block diagram of the hardware of a computer numerical control (CNC) device for carrying out a tool life management system according to the present invention. In the figure, reference numeral 10 denotes a computer numerical control (CNC) device. A processor 11 for globally controlling the numerical control (CNC) device 10 reads via a bus 21 system programs stored in a ROM 12, and controls the entire operation of the numerical control (CNC) device 10 in accordance with the system programs. A RAM 13 stores temporary calculation data, display data and the like. An SRAM is used for the RAM 13. A CMOS 14 stores machining programs, various parameters and the like. Reference load torques, tool wear detection torques and tool breakage detection torques, mentioned later, are stored in the CMOS 14. The CMOS 14 is backed up by a battery, not shown, and is nonvolatile, whereby the data therein is retained even if the power supply to the numerical control (CNC) device 10 is cut off.

An interface 15 serves as an external equipment interface and is connected to external equipment 31 such as a paper tape reader, a paper tape puncher, a paper tape reader-puncher or the like. A machining program is read from the paper tape reader, and a machining program that has been edited by means of the numerical control (CNC) device 10 can be output to the paper tape puncher.

A PMC (programmable machine controller) 16 is built in the CNC 10 and controls a machine in accordance with a sequence program created in ladder format. Specifically, the PMC 16 converts M-, S- and T-functions, specified in a machining program, to signals necessary for the machine side in accordance with the sequence program, and outputs the converted signals to the machine side through an I/O unit 17. The output signals drive magnets etc. on the machine side or actuate hydraulic valves, pneumatic valves, electric actuators and the like. Also, the PMC 16 is supplied with signals from limit switches on the machine side and from switches on a machine control panel, subjects the input signals to the required processing, and then transfers the signals to the processor 11. Further, on receiving a tool change command from tool control means, the PMC 16 carries out tool change control, as described later.

A graphic control circuit 18 converts digital data, such as current positions of individual axes, alarms, parameters and image data, to picture signals, which are then output therefrom. The picture signals are supplied to a display device 26 of a CRT/MDI unit 25 and displayed thereat. An interface 19 receives data from a keyboard 27 of the CRT/MDI unit 25 and transfers the data to the processor 11.

An interface 20 is connected to a manual pulse generator 32 and supplied with pulses therefrom. The manual pulse generator 32 is mounted to the machine control panel, not shown, and is used for manually positioning machine movable parts with accuracy.

Axis control circuits 41 to 43 are supplied with move commands for the respective axes from the processor 11 and output the commands to servo amplifiers 51 to 53, respectively. On receiving the move commands, the servo amplifiers 51 to 53 drive servomotors 61 to 63 associated with the respective axes. The servomotor 63 for controlling the feed of a Z axis rotates a ball screw 64 to thereby control the position and feed rate in the Z-axis direction of a spindle head 74, which is connected to a spindle motor 73. Also, the servomotor 63 has a built-in pulse coder 631 for position detection, and a position signal from the pulse coder 631 is fed back in the form of a pulse train to the axis control circuit 43. Although not illustrated, a position detection pulse coder is built in each of the servomotor 61 for controlling the feed of an X axis and the servomotor 62 for controlling the feed of a Y axis, like the above servomotor 63, and position signals are fed back from these pulse coders in the form of a pulse train. Alternatively, a linear scale may be used as the position detector. Further, a velocity signal can be generated by subjecting each pulse train to F/V (frequency/velocity) conversion.

A spindle control circuit 71 is supplied with a spindle rotation command, a spindle orientation command, etc., and outputs a spindle speed signal to a spindle amplifier 72. On receiving the spindle speed signal, the spindle amplifier 72 rotates the spindle motor 73 at the commanded rotational speed. Also, the spindle amplifier 72 positions a spindle at a predetermined position in accordance with the orientation command.

To the spindle motor 73 is coupled a position coder 82 via gears or a belt. Accordingly, the position coder 82 rotates in synchronism with the spindle motor 73, and outputs feedback pulses, which are then read by the processor 11 through the spindle control circuit 71. The feedback pulses are used for moving the other axes in synchronism with the spindle motor 73 to carry out a machining operation such as drilling. By subjecting the feedback pulses to F/V (frequency/velocity) conversion, a velocity signal X1s, mentioned later, can be generated.

The spindle control circuit 71 includes a processor, not shown, for carrying out software processing, and has an observer 710 as part of the function thereof. The observer 710 is supplied with the aforesaid velocity signal X1s etc. and estimates a disturbance load torque Ys acting on the spindle motor 73. The estimated disturbance load torque Ys (hereinafter referred to as "disturbance load torque Ys") is supplied to the CPU 11, which then reads the disturbance load torque Ys and executes a predetermined process. The process executed by the observer 710 and the CPU 11 will be described in detail later.

A drill 75 is mounted on the spindle head 74 of the spindle motor 73, and rotation thereof is controlled via the spindle motor 73. The position and feed rate of the drill 75 in the Z-axis direction are controlled by the servomotor 63 through the spindle head 74.

The drill 75 is moved in the Z-axis direction by the servomotor 63 and cuts a hole in a workpiece 91. The workpiece 91 is fixed on a table 92, the movement of which in X and Y directions is controlled by the aforementioned X- and Y-axis servomotors 61 and 62, respectively, through a mechanism, not shown.

Figure 3:
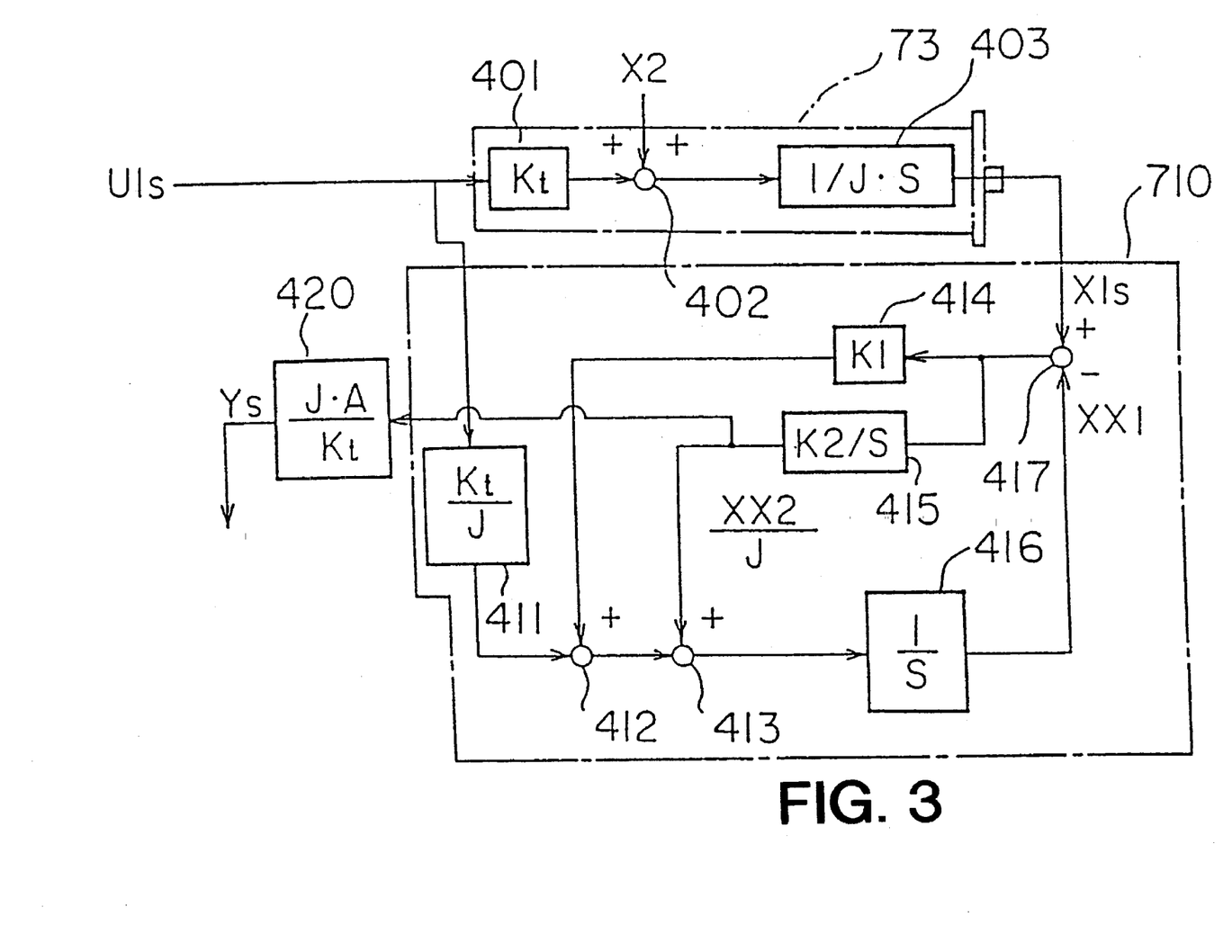
FIG. 3 is a block diagram illustrating an observer for estimating a disturbance load torque.

The observer 710 for estimating the aforementioned disturbance load torque Ys will be now explained.

FIG. 3 is a block diagram of the observer for estimating the disturbance load torque. The process illustrated in the block diagram is executed by the observer 710 in the spindle control circuit 71, as mentioned above.

The disturbance load torque Ys estimated by the observer 710 is a difference obtained by subtracting an acceleration/deceleration torque for acceleration/deceleration from the total torque of the spindle motor 73, and includes disturbance load torques such as a cutting load torque, a friction torque of mechanical parts, and like torques. For torques other than the cutting load torque, they can be excluded by predetermined calculation techniques on condition that the materials etc. of the drill and workpiece are the same.

In FIG. 3, a current command value U1s is a torque command value which is output to the spindle motor 73 upon receipt of a move command from the aforesaid processor 11, and is supplied to an element 401 to drive the spindle motor 73. At an operational element 402, a disturbance load torque X2 is added to the output torque of the spindle motor 73. The output of the operational element 402 is supplied to an element 403, which then outputs a velocity signal X1s. Symbol J represents the inertia of the spindle motor 73.

The current command value U1s is also supplied to the observer 710. Based on the current command value U1s and the velocity X1s of the spindle motor 73, the observer 710 estimates the disturbance load torque. In the following, description of the velocity control for the spindle motor 73 is omitted, and only the calculation for estimating the disturbance load torque is explained. The current command value U1s is multiplied by (Kt/J) at an element 411, and the result is output to an operational element 412. At the operational element 412, a feedback signal from a proportional element 414, described later, is added to the output of the element 411, and at an operational element 413, a feedback signal from an integral element 415 is added to the output of the element 412. The outputs of the operational elements 412 and 413 each represent acceleration. The output of the operational element 413 is supplied to an integral element 416, which then provides an output as an estimated velocity XX1 of the spindle motor 73.

An operational element 417 obtains a difference between the estimated velocity XX1 and the actual velocity X1s, and the difference obtained is fed back to each of the proportional element 414 and the integral element 415. The proportional element 414 has a proportional constant K1, the unit of which is $\sec^{-1}$. The integral element 415 has an integral constant K2, the unit of which is $\sec^{-2}$.

As seen from the figure, the integral element 415 provides an output (XX2/J), as indicated by the equation below:

$$(XX2/J) = (X1s - XX1) \cdot (K2/S) \qquad (1)$$
$$= (X2/J) \cdot [K2/(S^2 + K1 \cdot S + K2)]$$

The constants K1 and K2 are selected such that the pole is stabilized; then the above equation becomes $$(XX2/J) \div (X2/J)$$
$$XX2 \div X2 \qquad (2)$$

Namely, the disturbance load torque X2 can be estimated by XX2. The output of the integral element 415 is, however, an estimated acceleration (XX2/J) obtained by dividing the estimated disturbance load torque XX2 by J. The estimated acceleration (XX2/J) is converted to a current value at a proportional element 420, and this current value is employed as the estimated disturbance load torque Ys. Symbol J represents the inertia of the spindle motor 73 and is identical to that in the aforementioned element 403, and Kt represents a torque constant identical to that in the element 401. Symbol A represents a coefficient having a value of "1" or less and used for correcting the estimated acceleration (XX2/J). In this manner, the disturbance load torque Ys (X2) of the spindle motor 73 can be estimated by using the observer 710.

The CPU 11 measures the estimated disturbance load torque Ys as a load torque of the spindle. Although the cutting load torque acting on the drill 75 is not identical with the load torque of the spindle motor 73, they can be regarded as identical in cases where the friction torque of the mechanical parts, etc. is small. Where the cutting load is very small, however, the friction torque etc. need be excluded. In the description of this embodiment, the friction torque is not considered.

Figure 1:
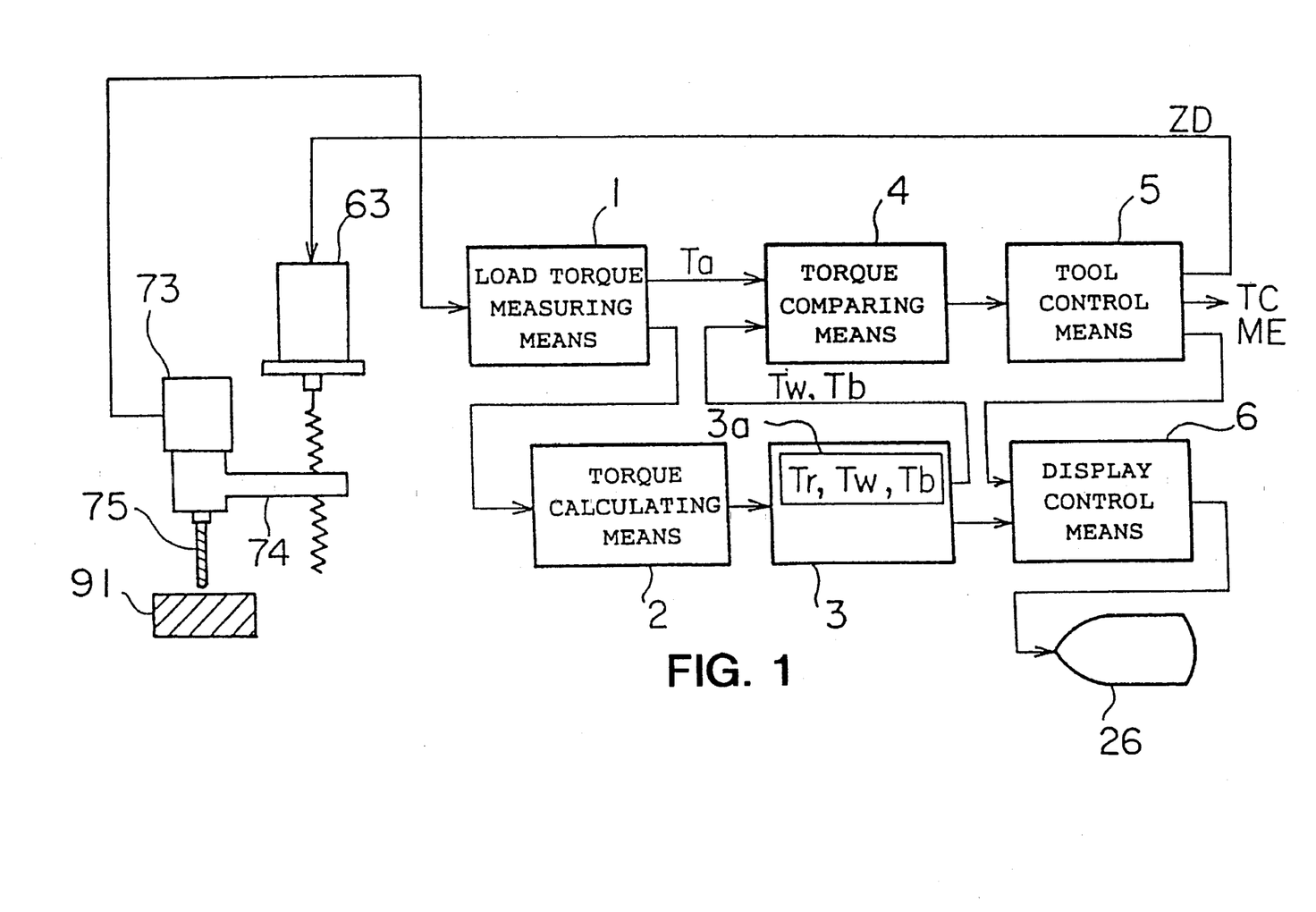
FIG. 1 is a block diagram illustrating the principles of the present invention.

FIG. 1 is a block diagram illustrating the principles of the present invention. Load torque measuring means 1 estimates the disturbance load torque Ys acting on the spindle motor 73, based on the velocity signal X1s of the spindle motor 73 and the torque command value U1s for the motor 73. The friction torque and the like are subtracted from the disturbance load torque Ys, to thereby measure the load torque of the spindle.

During an initial cutting, that is, when the tool is new or has just been ground, a machining operation is carried out. The load torque of the spindle, obtained during this machining operation, is stored in a memory 3 as a reference load torque Tr. Also, torque calculating means 2 calculates a tool wear detection torque Tw based on the reference load torque Tr, and a tool breakage detection torque Tb based on the tool diameter.

The tool wear detection torque Tw and tool breakage detection torque Tb thus calculated are stored in the memory 3.

Subsequently, actual machining is carried out. The load torque measuring means 1 measures the load torque of the spindle motor 73, as in the case of the initial cutting. Torque comparing means 4 compares each of the tool wear detection torque Tw and the tool breakage detection torque Tb with an actual load torque Ta, and outputs the result of the comparison.

Based on the result of the comparison, tool control means 5 outputs a Z-axis deceleration command ZD, a tool change command TC, or a machining stop command ME, as described in detail later.

Display control means 6 displays the reference load torque Tr, the tool wear detection torque Tw and the tool breakage detection torque Tb at the display device 26 in accordance with the operator's manipulation. When the actual load torque Ta becomes greater than the tool wear detection torque Tw, the tool control means 5 outputs a message requesting the selection of either the Z-axis deceleration command or the tool change command to be output, and the display control means 6 displays the message at the display device 26.

The drill 75 is mounted on the spindle head 74 and rotation thereof is controlled via the spindle motor 73. The position and feed rate of the drill 75 in the Z-axis direction are controlled by the servomotor 63 through the spindle head 74. The drill 75 is moved in the Z-axis direction by the servomotor 63 to cut a hole in the workpiece 91.

Figure 4:
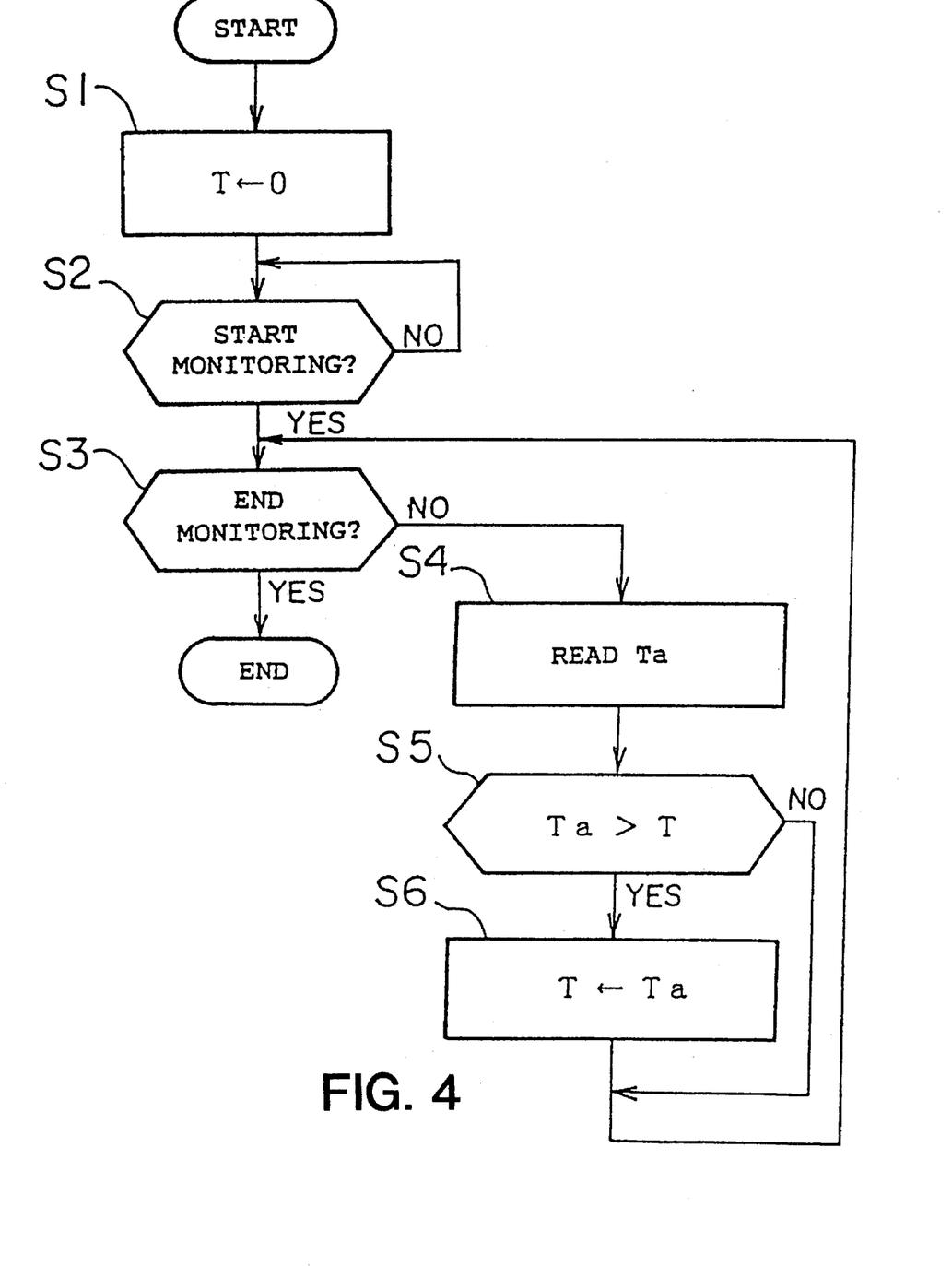
FIG. 4 is a flowchart of a process for obtaining a reference load torque.

How the reference load torque Tr is obtained will be now described. FIG. 4 is a flowchart of a process for obtaining the reference load torque Tr. This process is executed mainly by the torque calculating means 2 in FIG. 1, during an initial cutting state, that is, when the tool is new or has just been ground. In the figure, the numbers following "S" denote step numbers.

[S1] The value "0" is written in a register for storing the reference load torque Tr, whereby the register is reset.

[S2] It is determined whether monitoring is to be started, and if the monitoring is to be started, the flow proceeds to S3.

[S3] It is determined whether the monitoring is to be ended, and if the monitoring is to be continued, the flow proceeds to S4.

[S4] An actual load torque Ta of the spindle is measured. This step is executed by the observer explained with reference to FIG. 3.

[S5] If the actual load torque Ta is greater than the value T in the register, the flow proceeds to S6; if not, the flow returns to S3.

[S6] The value of the actual load torque Ta is stored in the register, because the actual load torque Ta is greater than the value T in the register.

By repeating the sequence S4–S6, a maximum initial load torque Ta can be finally obtained. This maximum initial load torque Ta is employed as the reference load torque Tr. The reference load torque Tr is stored in the memory 3, as mentioned before.

Alternatively, a plurality of reference load torques Tr may be obtained so that an average value of the torques can be used as the final reference load torque Tr.

The method of obtaining the tool wear detection torque Tw and the tool breakage detection torque Tb will be now explained in detail.

The tool wear detection torque Tw is obtained by multiplying the reference load torque Tr by a fixed coefficient α, as indicated by the following equation:

$$Tw = \alpha \cdot Tr \qquad (3)$$

The coefficient α is obtained experimentally, and good results were obtained when α was set to about 1.3.

The tool breakage detection torque Tb is obtained according to the following equation:

$$Tb = 0.8 \cdot \beta \cdot [D/(1+\gamma D)]^3 \qquad (4)$$

where D is the tool diameter. The values β and γ are obtained experimentally, and good results were obtained when β=4.3 and γ=0.35. In the equation, $$\beta \cdot [D/(1+\gamma D)]^3$$

represents a tool breakage load torque. To eliminate breakage of the tool, tool breakage is detected based on a value obtained by multiplying the tool breakage load torque by a safety factor of 0.8, thereby avoiding breakage of the tool.

The reference load torque Tr, the tool wear detection torque Tw and the tool breakage detection torque Tb are calculated by the torque calculating means 2, as mentioned above, and are stored in the memory 3 as tool data.

Figure 5:
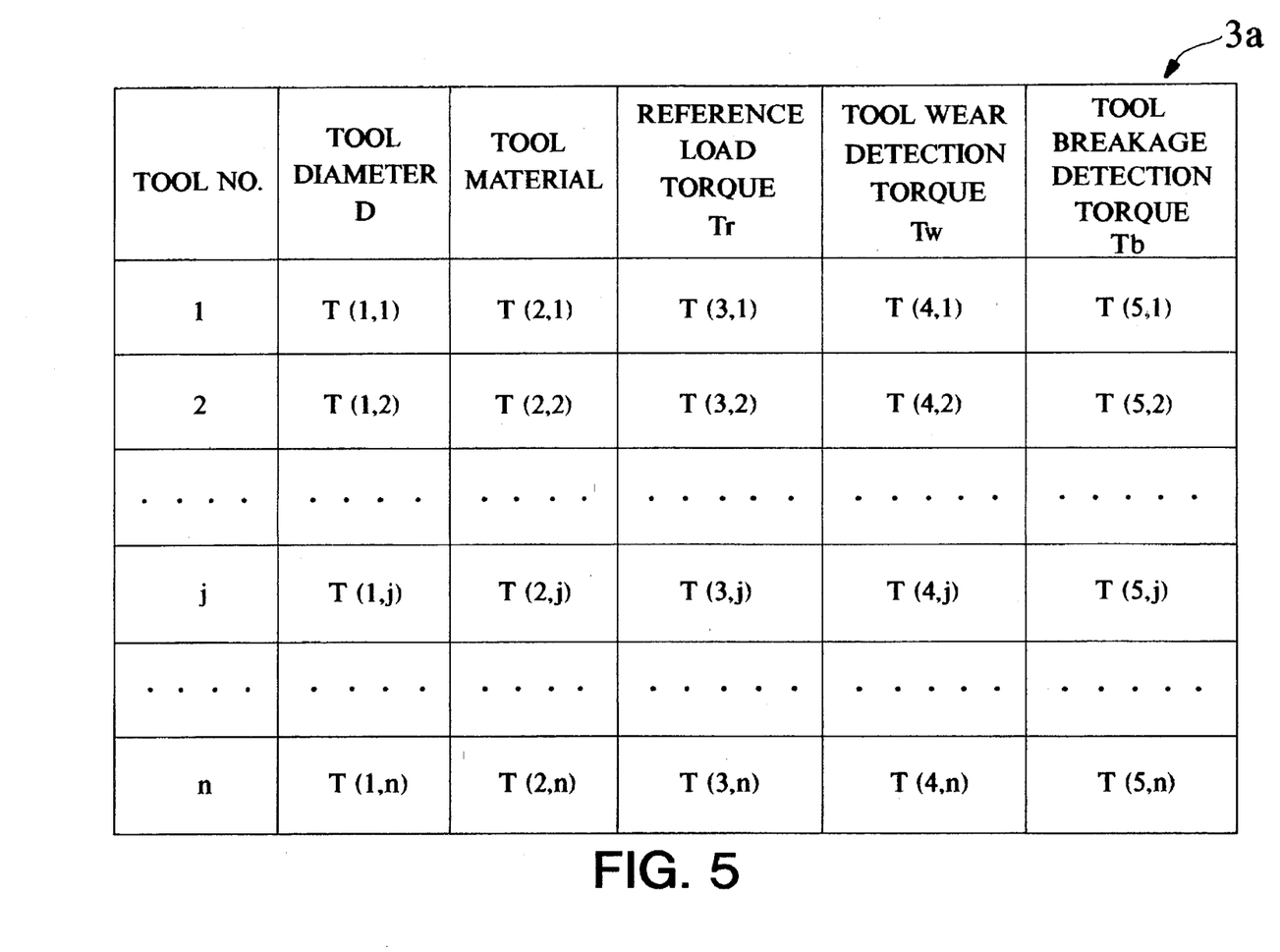
FIG. 5 is a diagram illustrating tool data stored in memory in relation to each tool number.

FIG. 5 is a diagram illustrating the tool data stored in the memory in relation to each tool number. In the tool number field of the tool data 3a, tool numbers are stored, and in the material field, materials of tools are entered by code numbers. The values of the reference load torque Tr, tool wear detection torque Tw and tool breakage detection torque Tb are stored in the order named. T(1, 1) denotes the address of tool data; for example, the diameter of the tool No. 1 is stored at address T(1, 1), the material of the tool No. 1 is stored at address T(2, 1), and the reference load torque Tr, tool wear detection torque Tw and tool breakage detection torque Tb of the tool No. 1 are stored at addresses T(3, 1), T(4, 1) and T(5, 1), respectively.

Figure 6:
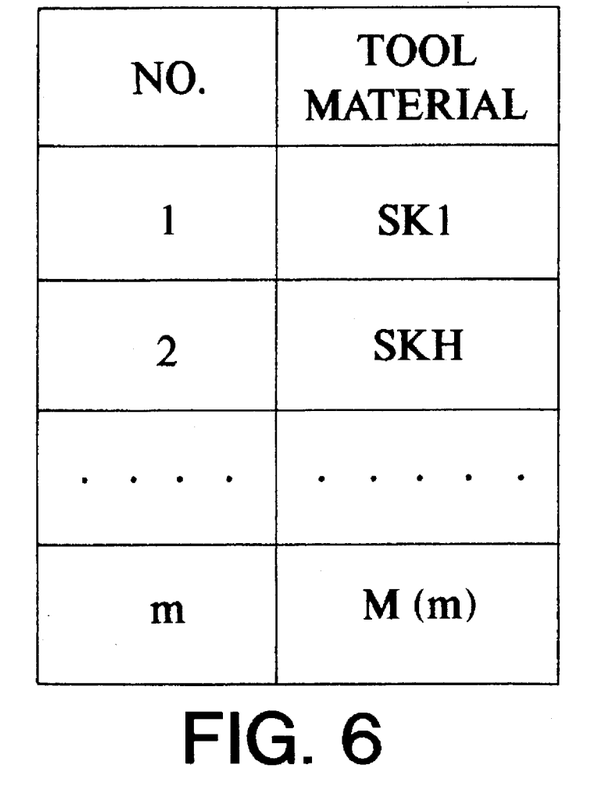
FIG. 6 is a diagram illustrating the relationship between tool material and code number.

FIG. 6 is a diagram illustrating the relationship between the tool material and code number. Namely, "NO. 1" denotes the material SK1 and "NO. 2" denotes the material SKH. The code numbers are used for entering tool material data.

Figure 7:
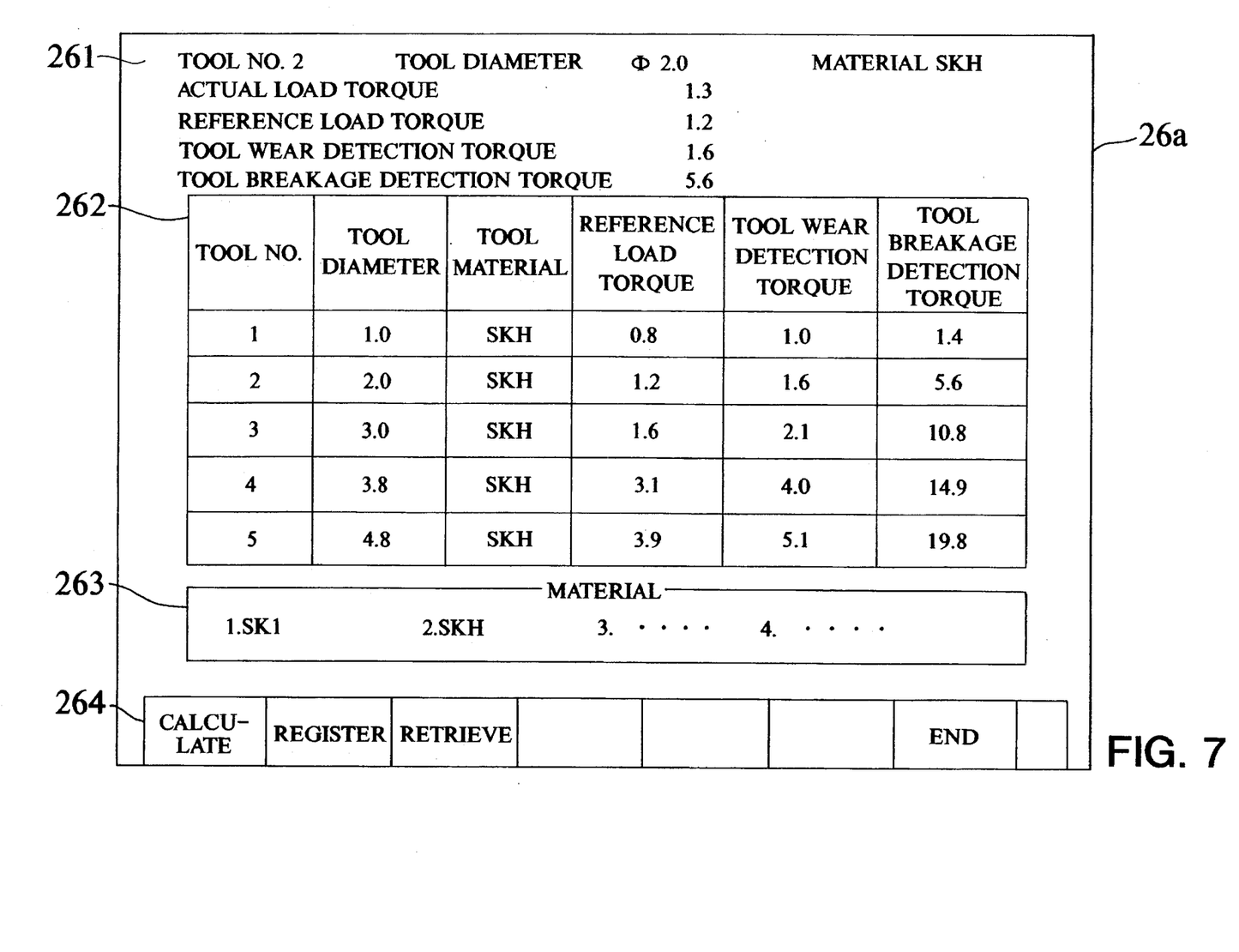
FIG. 7 is a diagram illustrating a screen displaying tool data.

Next, a screen displaying the tool data described above will be explained. FIG. 7 is a diagram of such a screen displaying the tool data, and this screen 26a is shown during actual machining operation. At the first line of an upper part 261 are displayed the number, diameter, and material of the tool actually used for the machining. Current load torque (actual load torque) is displayed at the second line, and the reference load torque Tr, the tool wear detection torque Tw and the tool breakage detection torque Tb are displayed at the third, fourth and fifth lines, respectively. During the initial machining state, the initial load torque is displayed at the third line, in place of the reference load torque Tr.

In the central part 262 is displayed the tool data explained with reference to FIG. 5. For the tool No. 1, for example, the tool diameter is 1.0, the tool material is SKH, the reference load torque Tr is 0.8, the tool wear detection torque Tw is 1.0, and the tool breakage detection torque Tb is 1.4.

The reference load torque Tr, the tool wear detection torque Tw and the tool breakage detection torque Tb are expressed in percentage (%) provided the rated output torque of the spindle motor 73 is 100%.

In the lower part 263 are shown tool materials and code numbers assigned thereto. For example, when inputting the material data for the tool No. 1, "2" is selected to enter the tool material SKH.

In the bottom part 264, the functions of software keys (not shown) located below the screen are shown. When the software key located below "CALCULATE" is pressed, the tool wear detection torque Tw and the tool breakage detection torque Tb are calculated based on the reference load torque Tr. "REGISTER" is used to register the tool diameter, material, etc. for the individual tool numbers. "RETRIEVE" is used to retrieve a screen or data. When the necessary operation is complete, the software key corresponding to "END" is pressed.

Figure 8:
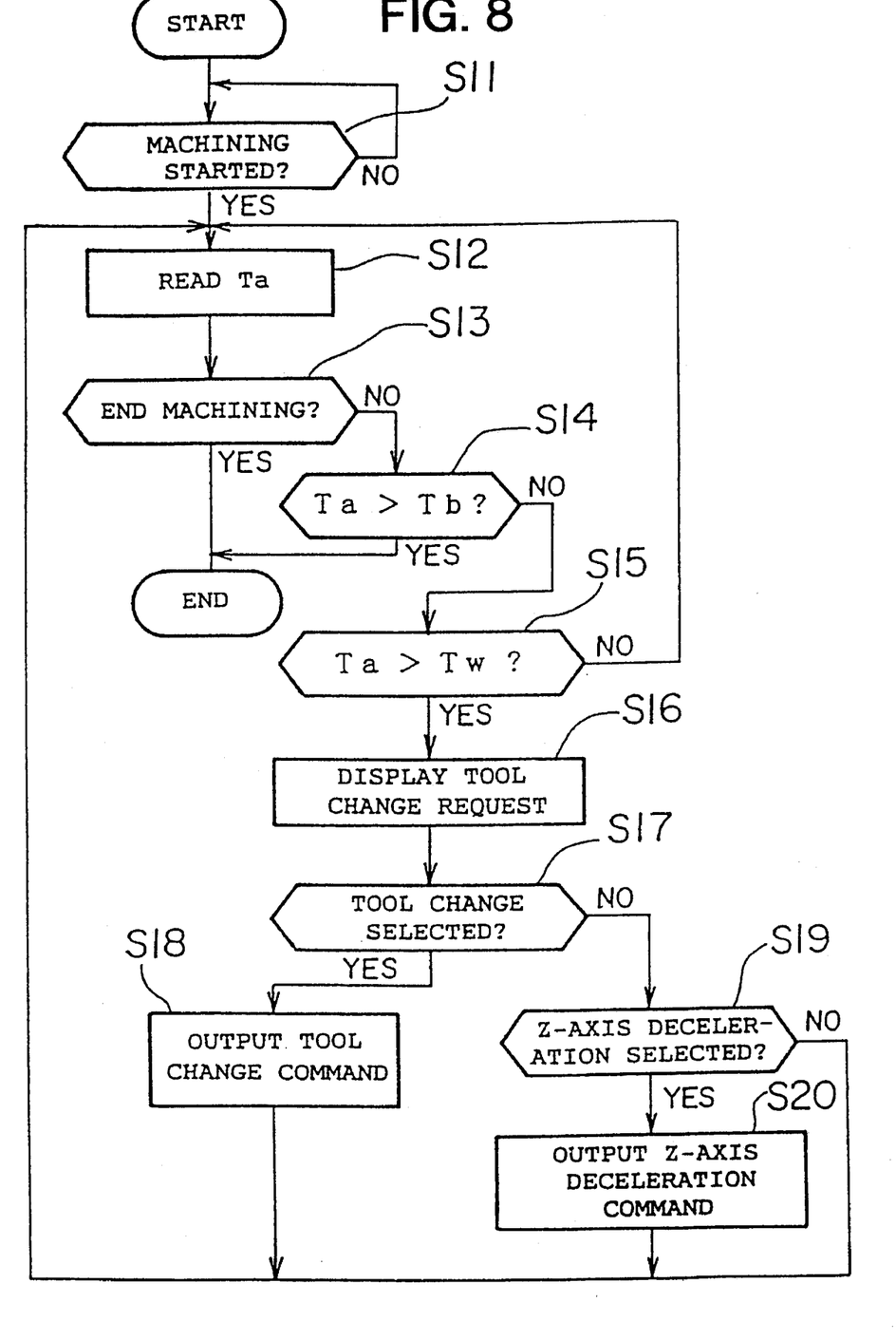
FIG. 8 is a flowchart of a process for tool life management.

Tool life management during actual machining state will be now described. FIG. 8 is a flowchart of a process for the tool life management. This process is executed mainly by the torque comparing means 4 and tool control means 5 shown in FIG. 1. In the flowchart, the numbers following "S" denote step numbers.

[S11] It is determined whether actual machining has been started, and if actual machining has been started, the flow proceeds to S12.

[S12] Actual load torque Ta is read.

[S13] If the machining is not ended, the flow proceeds to S14.

[S14] If the actual load is greater than the tool breakage detection torque Tb, then it is very likely that the tool may be damaged; therefore, the machining is ended. If Ta is not greater than Tb, the flow proceeds to S15.

[S15] If the actual load torque Ta is greater than the tool wear detection torque Tw, the flow proceeds to S16; if not, the flow returns to S12.

[S16] A tool change request, for example, the message "CHANGE THE TOOL IMMEDIATELY," is displayed on the screen 26a, because the actual load torque Ta is greater than the tool wear detection torque Tw.

The operator previously selects "TOOL CHANGE" or "Z-AXIS DECELERATION" to be activated when the actual load torque Ta becomes greater than the tool wear detection torque Tw.

[S17] If "TOOL CHANGE" is selected, the flow proceeds to S18; if not, the flow proceeds to S19.

[S18] Since "TOOL CHANGE" is selected, a tool change command is output.

[S19] If "Z-AXIS DECELERATION" is selected, the flow proceeds to S20; if not, the flow returns to S12.

[S20] Since "Z-AXIS DECELERATION" is selected, a Z-axis deceleration command is output.

In this manner, while machining is actually carried out, the actual load torque Ta is compared with each of the tool breakage detection torque Tb and the tool wear detection torque Tw, and based on the result of the comparison, the machining is stopped, or the tool change command or Z-axis deceleration command is output, thus permitting accurate tool life management.

Although in Step S14 mentioned above, the machining is immediately stopped, the tool change command may be output instead. Further, either machining stop or tool change may be selected in advance, so that the machining stop command or tool change command may be output according to the selection.

In the foregoing description, in order to measure the load torque of the spindle, the observer is used to derive the load torque from the disturbance load torque. Alternatively, the load torque may be obtained based on the load current of the spindle motor or be measured by a strain gauge or the like mounted on the tool or spindle.

Further, although in the above description, drilling is taken as an example of a machining operation, the invention is equally applicable to a milling operation.

As described above, according to the present invention, the tool wear detection torque and the tool breakage detection torque are obtained based, respectively, on the reference load torque and the tool diameter, and tool life management is carried out on the basis of the comparison of the torques, whereby the lives of tools can be managed with accuracy.

Furthermore, machining stop, tool change, Z-axis deceleration or the like can be selected, thus permitting flexible tool life management.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A tool life management system for managing a tool life, comprising:

load torque measuring means for measuring an initial load torque of a spindle attached to a tool during an initial machining operation and for measuring an actual load torque of the spindle attached to the tool during a subsequent actual machining operation, by using an observer and excluding a friction torque from a disturbance load torque;

torque calculating means for calculating a tool wear detection torque based on a reference load torque, and for calculating a tool breakage detection torque based on a tool diameter, the reference load torque being said initial load torque of the spindle;

a memory for storing the reference load torque, the tool wear detection torque and the tool breakage detection torque;

torque comparing means for comparing said actual load torque of the spindle with each of the tool wear detection torque and the tool breakage detection torque, and for outputting a result of the comparison; and tool control means for controlling said tool in accordance with the result of the comparison.

2. The tool life management system according to claim 1, wherein said tool control means outputs a machining stop command when the actual load torque becomes greater than the tool breakage detection torque, and outputs one of a Z-axis deceleration command and a tool change command when the actual load torque becomes greater than the tool wear detection torque.

3. The tool life management system according to claim 2, wherein, when the actual load torque becomes greater than the tool wear detection torque, said tool control means outputs the Z-axis deceleration command or the tool change command which is selected beforehand.

4. The tool life management system according to claim 2, wherein, when the actual load torque becomes greater than the tool breakage detection torque, said tool control means suspends the actual machining operation and outputs the machining stop command or the tool change command which is selected beforehand.

5. The tool life management system according to claim 1, wherein said torque calculating means calculates the tool wear detection torque by multiplying the reference load torque by a fixed coefficient.

6. The tool life management system according to claim 1, wherein said torque calculating means calculates the tool breakage detection torque based on the tool diameter in accordance with the equation:

$$Tb = K \cdot \beta \cdot [D/(1+\gamma D)]^3$$

(where Tb is the tool breakage detection torque, K is a safety factor, D is the tool diameter, $\beta$ and $\gamma$ are experimentally obtained constants, respectively, and Tr is the reference load torque).

7. The tool life management system according to claim 1, further comprising display control means for displaying at a display device the reference load torque, the tool wear detection torque and the tool breakage detection torque stored in said memory.

* * * * *

UNITED STATES PATENT AND TRADEMARK OFFICE
CERTIFICATE OF CORRECTION

PATENT NO. : 5,568,028
DATED : October 22, 1996
INVENTOR(S) : Tatsuhiro UCHIYAMA, et al.

It is certified that error appears in the above-indentified patent and that said Letters Patent is hereby corrected as shown below:

Title page,
Item [75], Inventors, line 3, change "Kamanashi" to --Yamanashi--

Col. 5, line 58, delete the paragraph indentation

Signed and Sealed this

Twenty-eighth Day of January, 1997

Attest:

BRUCE LEHMAN

Attesting Officer    Commissioner of Patents and Trademarks